United States Patent Office 3,419,350
Patented Dec. 31, 1968

3,419,350
CONVERSION OF AMMONIUM ALUMINOSILICATE TO HYDROGEN ALUMINOSILICATE
Leonard C. Drake, Wenonah, N.J., assignor to Mobil Oil Corporation, a corporation of New York
No Drawing. Filed Nov. 14, 1966, Ser. No. 593,645
5 Claims. (Cl. 23—111)

This invention relates to a low temperature method for converting a crystalline aluminosilicate to the hydrogen form, i.e., to a crystalline hydrogen aluminosilicate. The conversion involves the decomposition of the ammonium cations of the starting material to ammonia gas, which is driven off, and to hydrogen cations, which remain to form the hydrogen aluminosilicate.

Although frequently performed, the conversion has always been done at temperatures well above 570° F., and generally in the presence of a gas like air, oxygen, nitrogen, hydrogen, etc. or in a substantial vacuum. It is proposed herein to carry out the reaction at substantially lower temperatures, not exceeding 500° F. and preferably not above 350° F. The hydrogen aluminosilicate product, often termed acid aluminosilicate or hydrogen zeolite, is of value as a hydrocarbon conversion catalyst and also for making other catalysts useful in hydrocarbon conversions.

The ammonium aluminosilicate may be the ammonium salt of any crystalline aluminosilicate generally represented by the formula:

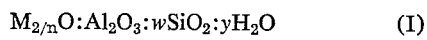
$$M_{2/n}O:Al_2O_3:wSiO_2:yH_2O \qquad (I)$$

wherein M is the ammonium cation, $n$ represents the valence of M, $w$ is the moles of $SiO_2$, and $y$ the moles of $H_2O$. In turn, the salt may be derived from an aluminosilicate corresponding to Formula I, except that in this case M represents a cation of a metal of groups I through VIII of the periodic system; in the usual case, M is sodium. Preferred classes of aluminosilicates are those of the X type, usually designated zeolite X; also Y, L, and D, merely to name a few, all of which are synthetic; also natural materials like levynite, offretite, faujasites, analcite, paulingite, chabazite, gmelinite, and mordenite. All of these zeolites have pores of a diameter in the range of 5 or 6 to 15 Angstroms. All have been described in the patent literature and therefore require no further description. Thus, zeolite X is set forth in U.S. 2,882,244; zeolites Y and L in U.S. 3,130,006; and zeolite D in Canadian 611,981 of Jan. 3, 1961.

The ammonium aluminosilicate, or ammonium zeolite, is generally prepared by base exchanging the corresponding sodium zeolite with an aqueous ammonium salt solution. To illustrate the treatment, the starting sodium aluminosilicate may be arranged in the form of a fixed bed, and the aqueous ammonium salt solution is passed slowly through the bed at room temperature and atmospheric pressure for a time sufficient to substantially exhaust the sodium cations of the original aluminosilicate. The aqueous solution is characterized by having a pH above that at which the aluminosilicate decomposes, preferably above 4. When the treatment is finished, the resulting composite is washed preferably with distilled water until the effluent wash water has a pH between 5 and 8. Suitable ammonium salts include the chloride, bromide, and nitrate; others are set forth in U.S. 3,140,252 and 3,140,253. The exchange step may be repeated as often as necessary to get substantially complete replacement of sodium by ammonium cation.

The ammonium zeolite, suitably in the form of granules disposed in a bed which may be static or agitated, preferably the latter, is then heated to a temperature in the range of 200–500° F., preferably 250–350° F., while a stream of an ozone-containing gas is passed through the bed in intimate contact with the granules. Suitably the flow of gas ranges from 250 to 400 ml./min., and it is previously dried. The gas may be a mixture of ozone and oxygen, or it may be ozone and nitrogen, or other inert gases, in which the ozone concentration is about 0.25 to 10% by volume. While amounts of ozone more than 10% by volume may be used to good advantage, this is considered unnecessary and wasteful as lower amount of ozone works quite well. A mixture of ozone and oxygen is particularly suitable since it may be formed simply by passing dried oxygen through an ozone generator of the type hereinafter described. Ozone and air, made by passing air through the ozone generator, may also be used.

The duration of the combined heating and ozone-contacting steps should be sufficient to achieve the desired conversion of ammonium zeolite to hydrogen zeolite. As will be noted from Example 4 below, substantially complete conversion may be obtained at a temperature of 285–330° F. and an ozone concentration of 4% of an ozone-oxygen gas stream, if the heating and gas contacting are carried out for a period of 16 hours. This period may be reduced by increasing the ozone concentration, or raising the temperature towards 400° F., or by employing both alternatives. Very substantial conversion of the ammonium salt is obtainable in a period of 2 to 3 hours, as demonstrated in Example 5 where 86% of the ammonium salt was converted to the hydrogen form.

The invention may be illustrated by the following examples.

Example 1

An ammonium Y zeolite was prepared from a sodium Y zeolite, the latter having been conventionally prepared from colloidal silica, sodium aluminate, sodium hydroxide, and water as follows: the NaY was base exchanged 11 times with a 3.6% ammonium sulfate-water solution at 180° F. and 19 times with a 7.2% ammonium sulfate-water solution at 180° F., washed sulfate-free, and dried at 250° F. This $NH_4Y$ zeolite contained 0.69% Na and 4.3% nitrogen based on the weight of the sample after drying at 250° F. It was in granular form and was used for each experiment described in the following examples.

Example 2

Illustrative of the superiority of an ozone-containing stream over use of pure oxygen are the following two experiments, identical except that in the second ozone was present.

(A) A 4.30 g. sample of the $NH_4Y$ granules of Example 1 was placed in a porcelain boat and heated and maintained at 230° F. in a stream of oxygen, about 200 ml./min., for two hours. The nitrogen content of this sample after the oxygen treatment, which reflected the extent of conversion, was 4.48%. Thus the amount of nitrogen actually increased over that in the original $NH_4Y$, showing the treatment to be ineffective.

(B) A 4.58 g. sample of the same $NH_4Y$ was treated in the same equipment and conditions for two hours with a stream of oxygen and ozone, the ozone content being about 4%. This stream was prepared by passing dried oxygen at about 250–400 ml./min. through a commercially available ozone generator. The nitrogen content of the sample after treatment was only 3.40%. About 24% of the nitrogen had been removed.

Example 3

A pair of experiments similar to the last were run, but at a higher temperature.

(A) A 3.11 g. sample of NH$_4$Y granules was treated with oxygen in the same equipment as in Example 1 for three hours at 375° F. The nitrogen content of the treated sample was 4.45%. Once again the treatment was ineffective to convert NH$_4$Y to acid Y.

(B) A 4.13 g. sample of the same NH$_4$Y was treated in the same equipment and conditions, but only for two hours, with a stream of oxygen and ozone containing about 4% ozone. The nitrogen content of this sample was reduced to 1.65%. About 63% of the nitrogen had been removed.

Example 4

The following illustrates a procedure for obtaining substantially complete conversion of ammonium Y to acid Y. Granules of NH$_4$Y of Example 1 were treated with oxygen, while being tumbled in a rotating glass flask, for two hours at 270–365° F. They had a nitrogen content of 4.70%, indicating no conversion to HY.

Then 23.12 g. of the NH$_4$Y sample after the above oxygen treatment were treated in a tumbling bed at 285–330° F. for 16 hours with the above-described oxygen-ozone stream (about 4% ozone), after which the nitrogen content of the zeolite was less than 0.01%. Essentially all of the nitrogen had been removed.

Example 5

This example shows that a high conversion is obtainable over a time as short as 2.5 hours. A granular sample of the NH$_4$Y zeolite, after treatment according to the first part of Example 4, and containing 4.70% nitrogen was treated for 2.5 hours at 350–390° F. with the described oxygen-ozone stream, in a tumbling bed. The nitrogen content of the treated sample was only 0.63%. About 86% of the nitrogen was removed.

It will be understood that the invention is capable of obvious variations without departing from its scope.

In the light of the foregoing description, the following is claimed:

1. A method for producing crystalline hydrogen aluminosilicate from crystalline ammonium aluminosilicate which comprises heating the latter in the presence of an ozone-containing gas to a temperature between about 200 and about 500° F., thereby substantially completely converting said ammonium crystalline aluminosilicate to crystalline hydrogen aluminosilicate.

2. A method according to claim 1 in which said ozone-containing gas comprises no more than about 10% by volume of ozone.

3. A method according to claim 2 wherein said ozone-containing gas comprises ozone and oxygen.

4. A method according to claim 2 wherein said ozone-containing gas comprises ozone and an inert gas.

5. A method according to claim 1 wherein said temperature is between about 250 and about 350° F.

References Cited

UNITED STATES PATENTS

| | | | |
|---|---|---|---|
| 3,130,006 | 4/1964 | Rabo et al. | 23—111 X |
| 3,287,282 | 11/1966 | Stiles | 23—113 X |
| 3,375,064 | 3/1968 | Miale et al. | 23—111 |

OTHER REFERENCES

Barrer, "Nature," vol. 164, July 16, 1949, pp. 112–113.

EDWARD J. MEROS, *Primary Examiner.*